US006240280B1

(12) United States Patent
Ravi et al.

(10) Patent No.: US 6,240,280 B1
(45) Date of Patent: *May 29, 2001

(54) SELECTION OF TRAFFIC CAPABLE STATION BY RDS RADIO WHILE LISTENING TO OTHER MEDIA

(75) Inventors: Latha Ravi, Farmington Hills; Douglas Brian Gillespie, Sterling Heights; Douglas Scott Arrowsmith, Milford, all of MI (US)

(73) Assignee: Thomson Consumer Electronics Sales GmbH, Hannover (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/920,145

(22) Filed: Aug. 26, 1997

(51) Int. Cl.[7] ........................ H04B 1/18
(52) U.S. Cl. ........................ 455/161.1; 455/186.1
(58) Field of Search ........................ 369/7, 2; 381/34; 455/345, 161.2, 184.1, 152.1, 166.2, 186.1, 45, 161.1

(56) References Cited

U.S. PATENT DOCUMENTS

| | | | | |
|---|---|---|---|---|
| 4,881,273 | | 11/1989 | Koyama et al. . | |
| 4,969,209 | | 11/1990 | Schwob | 455/158 |
| 5,235,568 | * | 8/1993 | Masaru | 455/344 |
| 5,475,874 | | 12/1995 | Klos . | |
| 5,483,506 | * | 1/1996 | Yoshioka et al. | 369/7 |
| 5,603,108 | | 2/1997 | Thoone | 455/186.1 |
| 5,671,195 | * | 9/1997 | Lee | 455/345 |
| 5,734,971 | * | 3/1998 | Thayer et al. | 455/181.1 |
| 5,734,973 | * | 3/1998 | Honda | 455/186.1 |
| 5,752,177 | * | 5/1998 | Siegle et al. | 455/186.1 |
| 5,757,860 | | 5/1998 | Shiota | 375/316 |
| 5,819,166 | * | 10/1998 | Kimura et al. | 455/186.1 |
| 5,842,119 | | 11/1998 | Emerson et al. | 455/161.3 |
| 5,862,104 | * | 1/1999 | Matsumoto | 369/7 |

* cited by examiner

*Primary Examiner*—Nguyen T. Vo
*Assistant Examiner*—Naghmen Mehrpour
(74) *Attorney, Agent, or Firm*—Joseph S. Tripoli; Robert D. Shedd

(57) ABSTRACT

When an RDS or RBDS radio is used to listen to prerecorded media, the tuner monitors an RDS station in the background to determine when a traffic announcement is in progress. A search for selecting an appropriate station for background monitoring is provided which selects a station which is most likely to be in accordance with the individual preferences of the driver. The search method can also be used to find traffic capable stations, weather stations, emergency alert information, and news broadcasts.

15 Claims, 3 Drawing Sheets

SELECTION OF TRAFFIC CAPABLE STATION BY RDS RADIO WHILE LISTENING TO OTHER MEDIA

BACKGROUND OF THE INVENTION

The present invention relates in general to background monitoring of an RDS radio broadcast for traffic announcements, and more specifically to a search strategy for selecting a traffic capable station to be monitored when reproducing other audio media such as a cassette tape, compact disk, or a radio station without traffic capability.

Radio data systems such as the RDS system in Europe and the radio broadcast data system (RBDS) in the United States transmit auxiliary information with the radio broadcast including a traffic capable (TP) flag to identify broadcast stations which carry traffic announcements and a traffic announcement (TA) flag for identifying that a traffic announcement is currently being transmitted by the broadcast station. Other RDS flags are transmitted to identify emergency alert messages, news broadcasts, and weather announcements, for example. These flags allow a radio receiver to be tuned to a broadcast station that provides traffic information for a driver of an automobile. In addition, a radio receiver can monitor a traffic capable station during times that the audio system is reproducing audio signals from a source other than a traffic capable radio station (such as a cassette tape or compact disk; or even an AM radio station or a non-capable FM radio station if a separate radio tuner is available).

By monitoring the flags of a traffic capable station in the background while the audio system reproduces audio signals from other media, it is possible for the audio system to automatically switch to the traffic announcement when one is present thereby keeping the driver of a vehicle informed of traffic developments while driving. Whenever listening to an audio source which is not a traffic capable broadcast station, a search strategy must be adopted to find an appropriate broadcast station to be monitored in the background. If the last broadcast station to which the tuner was tuned before switching to the alternate media is not a traffic capable station, then a different station must be selected automatically by the receiver. Prior art receivers typically perform a standard station scan to find an RDS station transmitting the TP flag and have used either the first traffic capable station which is found or the strongest traffic capable station found during a search of the complete band.

A broadcast station which is traffic capable may or may not satisfy the individual preferences of an individual driver. The format, language, frequency, or coverage area of traffic announcements from various stations will vary. Therefore, an arbitrary search for a traffic-capable broadcast station can easily fail to provide the most optimal station for matching the preferences of any individual driver.

SUMMARY OF THE INVENTION

The present invention uses a search sequence for a traffic-capable broadcast station which increases the likelihood that the driver will get traffic announcements according to their individual preferences. In particular, the invention uses a search strategy giving preferences to broadcast stations stored in memory presets of the radio where listeners tend to store their favorite stations.

In one aspect, the invention provides a method for selecting a broadcast station for background monitoring to detect predetermined events as identified by a data flag transmitted within auxiliary data of a radio system while an audio system is reproducing audio signals from a source other than a broadcast station capable of transmitting the predetermined events. As a first step, auxiliary data is searched from respective broadcast stations until a broadcast station is found transmitting or capable of transmitting the data flag. Once a broadcast station is found, its auxiliary data is monitored to detect when a predetermined event is in progress. The searching step inspects broadcast stations saved in memory presets prior to conducting any scan of frequencies across the radio band.

DETAILED DESCRIPTION OF PREFERRED EMBODIMENTS

Figure 1:
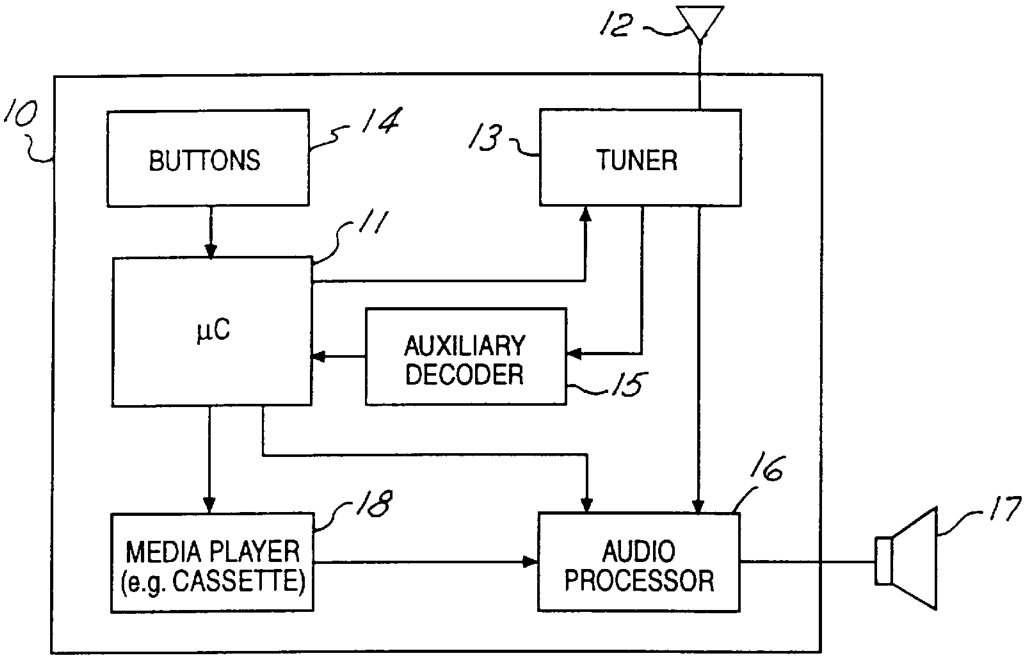
FIG. 1 is a block diagram showing an audio system according to the present invention.

As shown in FIG. 1, an RDS or RBDS radio receiver 10 operates under control of a microcontroller 11. Radio broadcast signals are picked up by an antenna 12 and relayed to a tuner 13 which tunes to a frequency under the control of microcontroller 11. The user can control the frequency of tuning via the radio buttons 14. If a received broadcast signal is an RDS or RBDS signal including auxiliary data, then the auxiliary data is decoded by an auxiliary decoder 15 connected between tuner 13 and microcontroller 11.

Audio signals from tuner 13 are processed through an audio processor 16 before being reproduced by a speaker 17. A media player 18 such as a cassette tape player or compact disk player provides audio signals to audio processor 16 during playback. Media player 18 and audio processor 16 operate under control of microcontroller 11.

When audio system 10 is reproducing audio signals from media player 18, microcontroller 11 can use tuner 13 and auxiliary decoder 15 to monitor for traffic announcements or other information (e.g., emergency alert, weather, or news) which a driver may desire during driving. When a traffic announcement or other information is detected, microcontroller 11 can pause media player 18 and switch audio processor 16 over to the broadcast station transmitting the traffic announcement or other information. If tuner 13 is a dual tuner with two separate tuning circuits, this function can even be performed when listening to a non-traffic capable radio station.

Figure 2:
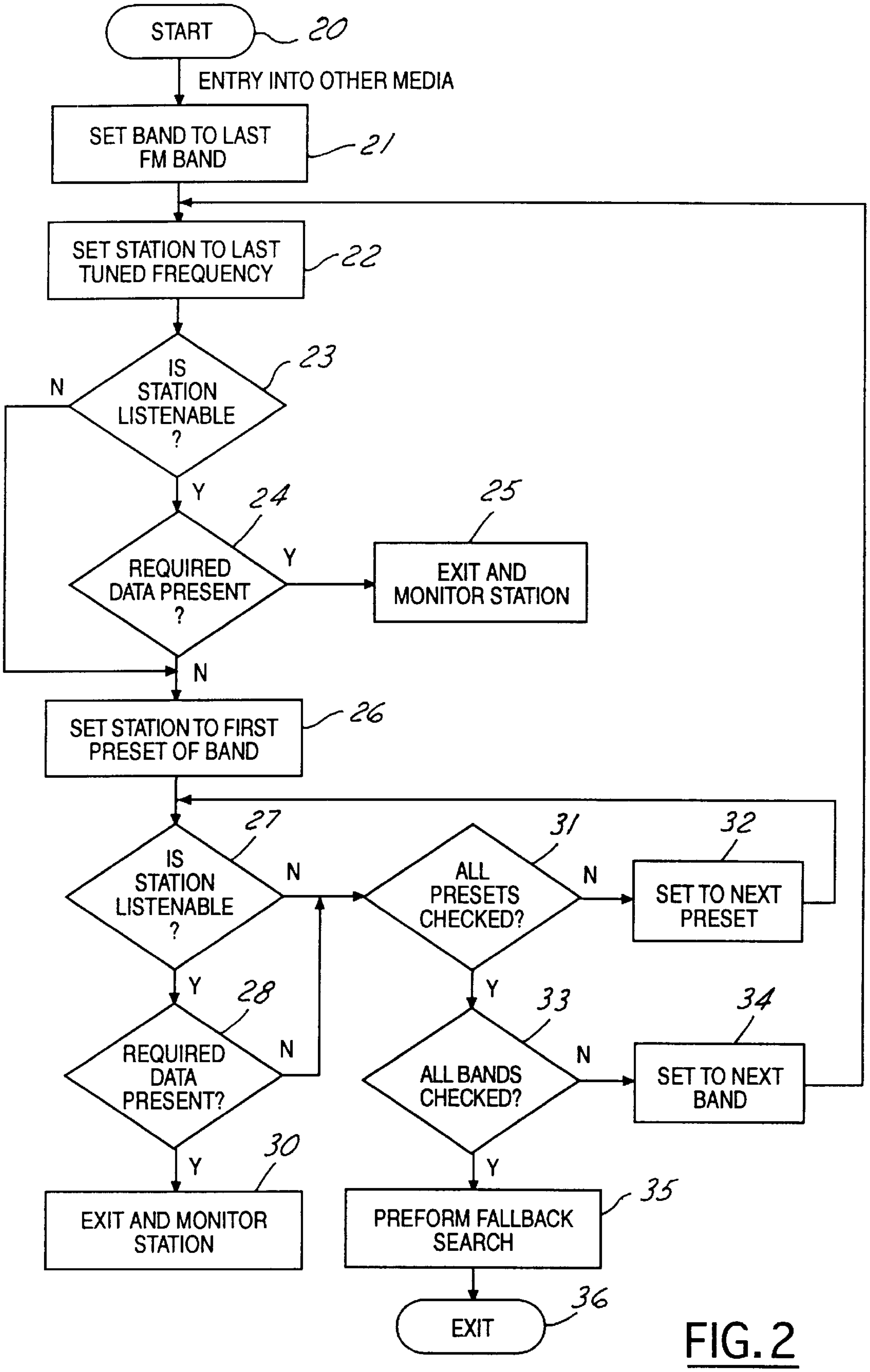
FIG. 2 is a flowchart showing the search sequence of the present invention.

The preferred method for selecting a broadcast station to monitor in the background for traffic announcements or other information is shown in FIG. 2. The method starts at step 20 upon the entry of the audio system into a media other than an FM station containing traffic announcement capability. In step 21, the tuner is set to the last FM band to which the radio receiver was tuned (i.e., to band FM1 or FM2 which are commonly used in automotive radios to increase the number of station presets). In step 22, the tuner is set to the last tuned frequency in the last FM band. A check is made to determine whether a listenable (i.e., receivable with a predetermined quality) station is present on the tuned-in frequency in step 23. If a listenable station is detected then the transmission is checked for the required data in step 24. For example, if checking for traffic capability, the TP flag is checked in the RDS data. Other data flags include a TA flag for a traffic announcement is progress, a weather announcement flag, an emergency alert, a news broadcast, or other RDS categories. If the required data is present, then the method is exited in step 25 and the radio receiver monitors the station for the desired event (e.g., a traffic announcement).

If the required data is not present or the frequency does not contain a listenable station, then the tuner is set to the first preset of the current band in step 26. A check is made for a listenable station in step 27 and for the required data in step 28. If they both are present, then the method is exited at step 30 and the current station is monitored for activity. If the current frequency does not contain a listenable station or if the required data is not present, then a check is made in step 31 to determine whether all presets in the band have been checked. If they have not, then the tuner is set to the next preset in the current band in step 32 and a return is made to step 27. If all presets have been checked, then a check is made in step 33 to determine whether all FM or RDS bands have been checked. If a band remains to be checked, then the tuner is set to the next band in step 34 and a return is made to step 22. If all bands have been checked then a fallback search is performed in step 35 in an attempt to find some other traffic capable station. The method is exited in step 36.

Figure 3:
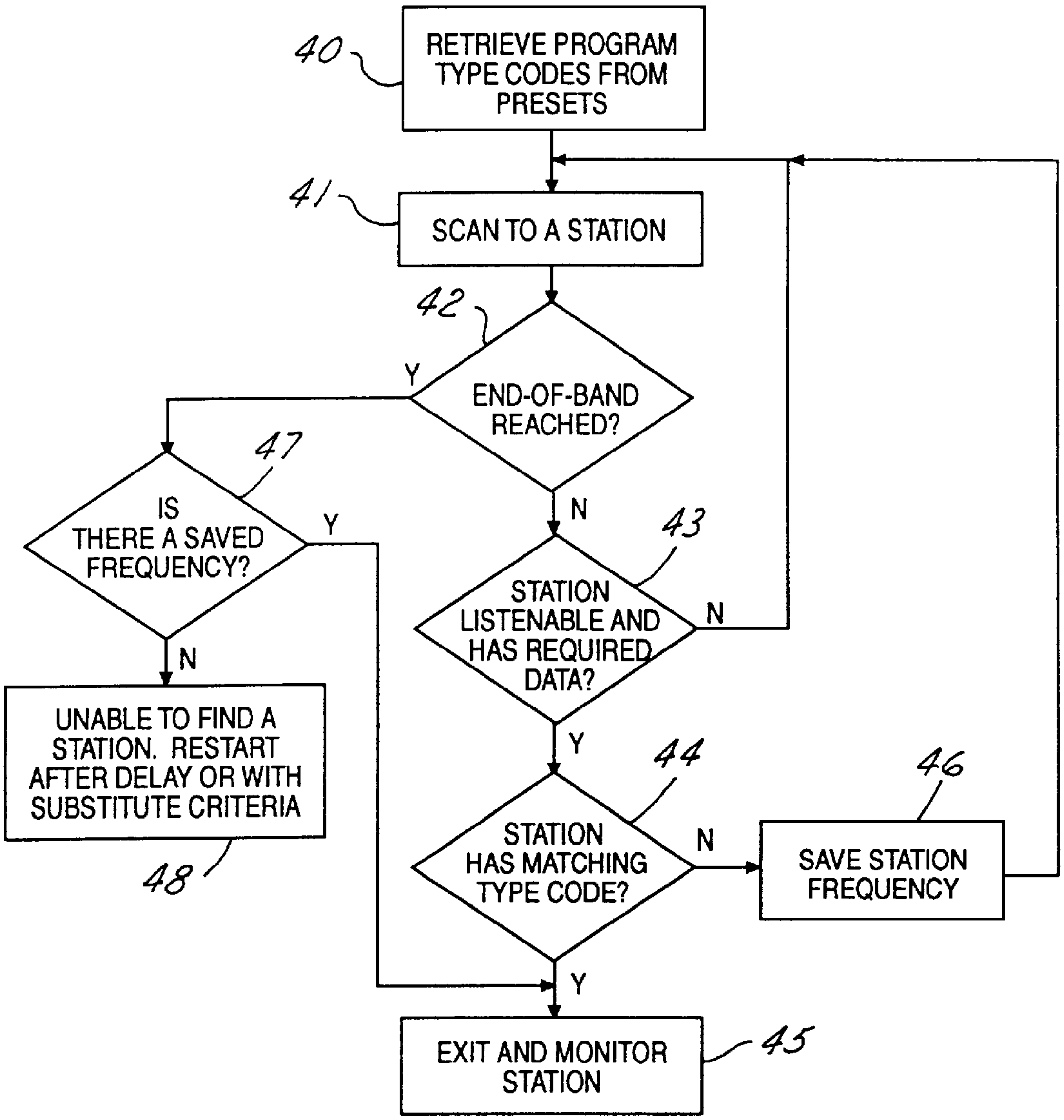
FIG. 3 is a flowchart showing a fallback search used in the present invention.

The fallback search in step 35 can be a standard seek of all sequential frequencies in the FM band. Alternatively, a preference may be given to stations having programmed types matching those of the presets as shown in FIG. 3. Consequently, if the alternate media is paused in order to reproduce a traffic announcement or other data, the method of FIG. 3 allows a station to be selected that has a program type that matches at least one type of station that the user has stored in a memory preset. Thus, the program type codes are retrieved associated with all of the FM presets in step 40. In step 41, a seek to sequential frequencies in the band is performed to find a receivable station. In step 42, a check is made to determine whether the full band has been scanned. When a station is found, a check is made in step 43 to determine whether the station is listenable and has the required data. Failing either of these requirements, a return is made to step 41 to continue the scan of the band. If a listenable station is found with the required data, a check is made is step 44 to determine whether the station has a matching program type code. Thus, if the stations stored in memory presets have program type codes of news, talk, and rock, then step 44 determines whether the station that it has found with the required data matches any of these program type codes. If no match is found, then the frequency of the station is saved in step 46 and a return is made to step 41 to continue the scan. If the program type code is a match, then the method is exited in step 45 and the receiver monitors the found station.

In step 42, if the full band has been scanned without finding a traffic capable station with a matching program type code, then a check is made in step 47 to determine whether a frequency has been saved for a traffic capable station without a matching program type code. If more than one such stations have been found, then a selection can be performed based on signal strength or any other desired criteria. The selected station is used for monitoring in step 45. If no station frequency has been saved, then no station is receivable satisfying the desired criteria of being traffic capable. Since the receiver was unable to find a station, it restarts the search in step 48 after a delay or with a substitute criteria for selecting the station (e.g., a different RDS flag is sought). For example, a first search may be conducted looking for a traffic announcement in progress, and a subsequent search may be made for a traffic capable station if no traffic announcement was found to be in progress.

Figure 4:
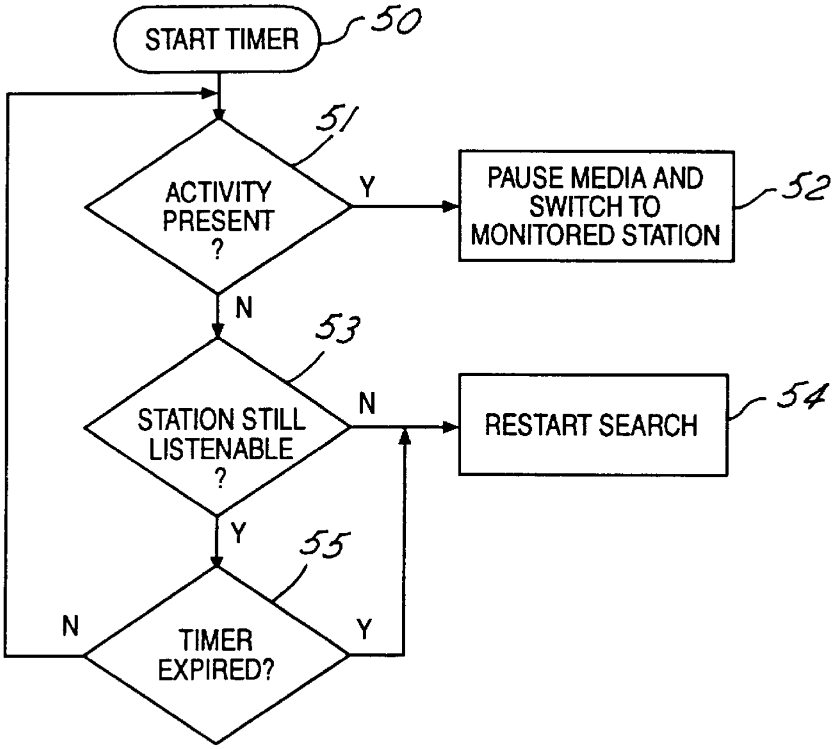
FIG. 4 is a flowchart showing the background monitoring function of the present invention.

A preferred embodiment for performing background monitoring is shown in FIG. 4. In step 50, a timer is started in order to measure a time when a new search should be conducted for a desired background station. In step 51, a check is made to determine if the predetermined activity or event is present or in progress. For example, if the predetermined event being monitored for is a traffic announcement, then a check is made of the auxiliary data to determine if the TA flag has been set. If the activity is present, then the alternate audio media is paused in step 52 and the audio system is switched to the monitored station in order to reproduce the predetermined event, such as the traffic announcement. If no activity is detected, then a check is made in step 53 to determine whether the station is still listenable. If the station has become unlistenable, then the search for a broadcast station is restarted in step 54. If the station is still listenable, then a check is made in step 55 to determine if the timer has expired. A time delay of a few minutes is preferred so that if the vehicle moves into an area where a more preferred background monitoring station has become receivable then it will be substituted as the monitored station. If the timer has expired, then the search is restarted in step 54. If the timer has not expired, then a return is made to step 51 to check for activity.

What is claimed is:

1. A method for automatically selecting a broadcast station for background monitoring to detect predetermined events as identified by a data flag transmitted within auxiliary data of a radio data system while an audio system is reproducing audio signals from a source other than a broadcast station capable of transmitting said predetermined events, said method comprising the steps of:

searching said auxiliary data received from respective broadcast stations until a broadcast station is found transmitting or capable of transmitting said data flag; and monitoring auxiliary data of said found broadcast station to detect when a predetermined event is in progress;

wherein said searching step inspects a plurality of broadcast stations saved in a plurality of memory presets prior to conducting a scan of frequencies across a radio band; and wherein the stations saved in said memory presents are "favorite" stations selected without regard to whether or not they are transmitting or capable of transmitting said data flag.

2. The method of claim 1 wherein said predetermined events are traffic announcements.

3. The method of claim 1 wherein said predetermined events are emergency alert messages.

4. The method of claim 1 wherein said predetermined events are news broadcasts.

5. The method of claim 1 wherein said predetermined events are weather announcements.

6. The method of claim 1 further comprising the steps of:

if said searching is completed without finding a broadcast station capable of broadcasting said predetermined events, then:

searching said auxiliary data received from respective broadcast stations until a broadcast station is found transmitting or capable of transmitting alternate events; and monitoring said auxiliary data of said found broadcast station to detect when an alternate event is in progress.

7. The method of claim 6 wherein said searching step for said alternate events inspects broadcast stations saved in memory presets prior to conducting a scan of frequencies across a radio band.

8. The method of claim 6 wherein said predetermined events are traffic announcements in progress and wherein said alternate events are traffic announcement capability.

9. A method for automatically selecting a broadcast station for background monitoring for traffic announcements in a radio data system while an audio system is reproducing audio signals from a source other than a broadcast station capable of broadcasting a traffic announcement, said method comprising the steps of:

searching auxiliary data received from respective broadcast stations until a broadcast station is found which identifies itself as being traffic capable; and monitoring auxiliary data of said found broadcast station to detect when a traffic announcement is in progress; and wherein said searching step inspects a plurality of broadcast stations saved in a plurality of memory presets prior to conducting a scan of frequencies across a radio band and;

wherein the stations saved in said memory presets are "favorite" stations selected without regard to whether or not they are transmitting or capable of transmitting said data flag.

10. The method of claim 9 wherein said searching step inspects broadcast stations in the order of:

last tuned station;

scan of presets; and scan through sequential frequencies in said radio band.

11. The method of claim 9 wherein said searching step inspects broadcast stations in the order of:

last tuned station in active FM band;

scan of presets in active FM band;

last tuned station in inactive FM band;

scan of presets in inactive FM band; and scan through sequential frequencies across said radio band.

12. The method of claim 9 wherein said searching step inspects broadcast stations in the order of:

last tuned station in active FM band;

scan of presets in active FM band;

last tuned station in inactive FM band;

scan of presets in inactive FM band;

scan through sequential frequencies across said radio band with an additional requirement that a broadcast station must have a program type code that matches a program type code for at least one broadcast station stored as a preset; and selecting a station from said scan through sequential frequencies without regard to said additional requirement.

13. The method of claim 9 further comprising the step of:

automatically reproducing a traffic announcement when it is detected.

14. The method according to claim 1 wherein said searching step first searches said auxiliary data of said favorite stations, which are broadcast stations saved previously in said plurality of memory presets, for a broadcast station either transmitting or capable of transmitting said data flag and when said data flag is not present in one of said favorite stations, said searching step next searches for an appropriate broadcast station either transmitting or capable of transmitting said data flag in a scan across said radio band.

15. The apparatus according to claim 8 wherein said auxiliary data of said favorite stations saved previously in a plurality of memory presets is first searched for a broadcast station either transmitting or capable of transmitting said data flag and when said data flag is not present in one of said favorite stations, an appropriate broadcast station either transmitting or capable of transmitting said data flag is next searched in a scan across said radio band.

* * * * *